(12) United States Patent
Benning

(10) Patent No.: US 12,729,068 B2
(45) Date of Patent: Sep. 8, 2026

(54) CONTACTING CLEANING SYSTEM

(71) Applicant: Illinois Tool Works Inc., Glenview, IL (US)

(72) Inventor: Matthew Benning, Glasgow (GB)

(73) Assignee: Illinois Tool Works Inc., Glenview, IL (US)

( * ) Notice: Subject to any disclaimer, the term of this patent is extended or adjusted under 35 U.S.C. 154(b) by 93 days.

(21) Appl. No.: 18/816,265

(22) Filed: Aug. 27, 2024

(65) Prior Publication Data

US 2025/0074713 A1 Mar. 6, 2025

(30) Foreign Application Priority Data

Aug. 31, 2023 (GB) ..................................... 2313256

(51) Int. Cl.
*B65G 41/00* (2006.01)
*B08B 1/34* (2024.01)
*B65G 23/44* (2006.01)
*B65G 45/18* (2006.01)

(52) U.S. Cl.
CPC ........... *B65G 41/003* (2013.01); *B65G 23/44* (2013.01); *B65G 45/18* (2013.01)

(58) Field of Classification Search
None
See application file for complete search history.

(56) References Cited

U.S. PATENT DOCUMENTS

| | | | | |
|---|---|---|---|---|
| 5,906,265 | A | 5/1999 | Spatafora | |
| 2008/0168876 | A1* | 7/2008 | Kilian | B26D 7/20 198/597 |
| 2011/0005894 | A1* | 1/2011 | Tsai | B65H 26/00 198/358 |
| 2011/0056797 | A1* | 3/2011 | Tsai | B65H 31/3009 198/374 |
| 2022/0194729 | A1 | 6/2022 | Dallan | |

FOREIGN PATENT DOCUMENTS

| | | | |
|---|---|---|---|
| AU | 2010101246 | A4 | 12/2010 |
| CN | 102361703 | | 2/2012 |
| EP | 0124177 | A1 | 11/1984 |
| GB | 2492991 | A | 1/2013 |
| GB | 2528052 | A | 1/2016 |

(Continued)

OTHER PUBLICATIONS

Combined Search and Examination Report Appln No. GB2313256.6 dated Feb. 12, 2024.

*Primary Examiner* — Gene O Crawford
*Assistant Examiner* — Muhammad Awais
(74) *Attorney, Agent, or Firm* — McAndrews Held & Malloy, Ltd.

(57) ABSTRACT

Disclosed conveyors for contact cleaning system include an inbound conveyor, and an outbound conveyor spaced apart from the inbound conveyor by a distance (A), wherein the inbound conveyor and/or the outbound conveyor is movable relative to the other of the inbound conveyor or the outbound conveyor between a retracted position in which the distance (A) is a first distance ($A_{cleaning}$) and an extended position in which the distance (A) is less than the first distance ($A_{cleaning}$).

11 Claims, 5 Drawing Sheets

(56) References Cited

FOREIGN PATENT DOCUMENTS

| | | | | | |
|---|---|---|---|---|---|
| JP | 2008086940 | | | 4/2008 | |
| JP | 2008086940 | A | * | 4/2008 | |
| JP | 2008272704 | | | 11/2008 | |
| JP | 2008272704 | A | * | 11/2008 | |
| JP | 2010207687 | | | 9/2010 | |
| KR | 20220065222 | A | * | 5/2022 | ............. B65G 37/00 |
| KR | 1020220065222 | A | | 5/2022 | |
| WO | 2010/109755 | A1 | | 9/2010 | |

* cited by examiner

CONTACTING CLEANING SYSTEM

RELATED APPLICATIONS

The present application claims the benefit of United Kingdom (GB) Patent Application No. 2313256.6, filed Aug. 31, 2023, entitled "CONTACTING CLEANING SYSTEM." The entirety of United Kingdom (GB) Patent Application No. 2313256.6 is expressly incorporated herein by reference.

TECHNICAL FIELD

The present disclosure relates to a conveyor for a contact cleaning system and particularly, but not exclusively, to a conveyor for a contact cleaning system having an inbound conveyor and an outbound conveyor movable between a retracted position and an extended position. The present disclosure also relates to a contact cleaning system comprising the conveyor.

BACKGROUND

Contact cleaning systems typically include a conveyor which conveys a substrate to be cleaned to contact cleaning rollers. Contact cleaning rollers have a contact surface including an elastomer material. The contact cleaning rollers rotate and, as the contact surface engages with a surface of the substrate, the contact surface collects debris or other contaminants and removes the debris or other contaminants from the substrate surface.

Examples of prior art contact cleaning systems have one upper set of contact cleaning rollers positioned above the conveyor surface. The contact cleaning rollers only clean an upper surface of the substrate as it passes below the contact cleaning rollers. If both the upper and lower surfaces of the substrate need to be cleaned, the substrate must be flipped over and conveyed along the conveyor again. Flipping the substrate and replacing it on the conveyor requires manual handling of the substrate, which may result in further debris being introduced onto the substrate surface.

Other examples of prior art contact cleaning systems clean upper and lower surfaces of the substrate simultaneously. These contact cleaning systems also include a lower set of contact cleaning rollers positioned in a plane of the conveyor. The lower set of contact cleaning rollers are positioned directly below the upper set of contact cleaning rollers such that both the upper and lower sets of contact cleaning rollers clean the upper and lower surfaces of the substrate simultaneously as the substrate passes between the upper and lower sets of contact cleaning rollers. An inbound conveyor conveys the substrate towards the contact cleaning rollers, and the substrate is transferred onto the lower contact cleaning rollers, which support the substrate as it passes through. The contact cleaning rollers rotate to clean the substrate surface and to transfer the substrate through the contact cleaning rollers and onto an outbound conveyor which conveys the substrate away from the contact cleaning rollers.

These contact cleaning systems can operate in a cleaning mode, in which the upper and lower sets of contact cleaning rollers will both contact the substrate. They can also operate in a bypass mode, in which the lower contact cleaning rollers are moved away from the plane of the conveyors. This may be desirable when only an upper surface of the substrate is to be cleaned, or when the substrate is to bypass cleaning altogether. In the bypass mode, substrates are unsupported as they pass from the inbound conveyor to the outbound conveyor.

It is an object of embodiments of the disclosure to at least mitigate one or more of the problems of the prior art.

BRIEF SUMMARY

Aspects and embodiments of the disclosure provide a conveyor for a contact cleaning system and a contact cleaning system as claimed in the appended claims.

According to an aspect of the disclosure, there is provided a conveyor for a contact cleaning system, the conveyor comprising an inbound conveyor, and an outbound conveyor spaced apart from the inbound conveyor by a distance (A), wherein the inbound conveyor and/or the outbound conveyor is movable relative to the other of the inbound conveyor or the outbound conveyor between a retracted position in which the distance (A) is a first distance ($A_{cleaning}$) and an extended position in which the distance (A) is less than the first distance ($A_{cleaning}$).

Advantageously, a substrate conveyed from the inbound conveyor to the outbound conveyor remains supported by the conveyor when the inbound conveyor and/or the outbound conveyor is in the extended position.

In certain embodiments, the inbound conveyor and the outbound conveyor may be configured to receive at least one contact cleaning roller therebetween when the inbound and outbound conveyors are in the retracted position. The inbound conveyor and the outbound conveyor may be configured to receive at least one contact cleaning roller therebetween when the inbound and outbound conveyors are in the retracted position such that a substrate can be supported by the at least one contact cleaning roller as it is conveyed from the inbound conveyor to the outbound conveyor.

Advantageously, the inbound and outbound conveyors are adjustable such that at least one contact cleaning roller can be received therebetween in the retracted position, and the inbound and outbound conveyors can support a substrate without the presence of at least one contact cleaning roller in the extended position.

In certain embodiments, the inbound conveyor, outbound conveyor and a surface of the at least one contact cleaning roller may be co-planar in the retracted position such that a substrate conveyed from the inbound conveyor to the outbound conveyor via the at least one contact cleaning roller remains level.

Advantageously, the inbound conveyor, outbound conveyor and at least one contact cleaning roller convey the substrate along a level surface. This can prevent damage to the substrate.

In certain embodiments, the distance (A) may be less than a length of a substrate to be supported on the conveyor when the inbound and outbound conveyors are in the extended position. The distance (A) may be less than a length of a substrate to be supported on the conveyor when the inbound and outbound conveyors are in the extended position such that the substrate can be supported by both the inbound conveyor and the outbound conveyor when the substrate is conveyed from the inbound conveyor to the outbound conveyor.

Advantageously, the distance (A) can be selected or adjusted based on the length of the substrate and the substrate will be supported by the inbound conveyor and the outbound conveyor without falling between the conveyors which can cause damage to the substrate.

In certain embodiments, the distance (A) may be a minimum distance ($A_{min}$) in the extended position.

In certain embodiments, the minimum distance ($A_{min}$) may be approximately 0.5 mm to approximately 50 mm. Preferably, the minimum distance ($A_{min}$) may be approximately 25 mm to approximately 45 mm. Preferably, the minimum distance ($A_{min}$) may be approximately 30 mm to approximately 40 mm, for example approximately 39 mm.

In certain embodiments, the distance (A) may be a maximum distance ($A_{max}$) in the retracted position.

In certain embodiments, the maximum distance ($A_{max}$) may be approximately 90 mm to approximately 110 mm. Preferably, the maximum distance ($A_{max}$) may be approximately 102 mm.

In certain embodiments, the inbound conveyor may comprise an inbound conveyor tensioning mechanism configured to maintain the inbound conveyor in a taut configuration in each of the retracted position and the extended position.

In certain embodiments, the outbound conveyor may comprise an outbound conveyor tensioning mechanism configured to maintain the outbound conveyor in a taut configuration in each of the retracted position and the extended position.

In certain embodiments the inbound conveyor and the outbound conveyor may comprise a tensioning mechanism configured to maintain both the inbound conveyor and the outbound conveyor in a taut configuration in each of the retracted position and the extended position.

Advantageously, the tensioning mechanism ensures that each of the inbound conveyor and/or the outbound conveyor remains taut as the inbound conveyor and/or the outbound conveyor moves between the retracted position and the extended position.

In certain embodiments, the tensioning mechanism, the inbound conveyor tensioning mechanism and/or the outbound conveyor tensioning mechanism may comprise a series of pulleys arranged to support the respective conveyor, for example the inbound conveyor or the outbound conveyor in a taut configuration. The series of pulleys may be attached to a frame of the inbound conveyor or a frame of the outbound conveyor. At least one of the series of pulleys may be arranged to move relative to the frame of the inbound conveyor or the frame of the outbound conveyor between a first position and a second position so as to maintain the inbound conveyor or the outbound conveyor in a taut configuration as the inbound conveyor or the outbound conveyor moves.

In certain embodiments, the conveyor may further comprise at least one mechanical adjustment means configured to move the inbound conveyor and/or the outbound conveyor between the retracted position and the extended position.

In certain embodiments, the conveyor further comprises at least one pneumatic adjustment means configured to move the inbound conveyor and/or the outbound conveyor between the retracted position and the extended position.

In certain embodiments, the conveyor further comprises at least one electromechanical adjustment means configured to move the inbound conveyor and/or the outbound conveyor between the retracted position and the extended position.

Advantageously, the position of the inbound conveyor and/or the outbound conveyor can be automatically adjusted between the retracted position and the extended position without manual intervention by an operator.

In certain embodiments, the inbound conveyor and/or the outbound conveyor may comprise a frame. The frame may comprise a static frame portion and a movable frame portion slidably connected to the static frame portion. The inbound conveyor and/or the outbound conveyor may be supported on both the static frame portion and the movable frame portion. The movable frame portion may be arranged to slide relative to the static frame portion to move towards the other of the inbound conveyor or the outbound conveyor.

According to another aspect of the disclosure, there is provided a contact cleaning system comprising the conveyor, wherein the conveyor is configured to support a substrate on a conveyor surface, and at least one of: one or more upper contact cleaning rollers positioned above the conveyor surface, wherein the one or more upper contact cleaning rollers are movable between a cleaning position in which a surface of the one or more upper contact cleaning rollers are arranged to contact an upper surface of a substrate conveyed from the inbound conveyor to the outbound conveyor, and a withdrawn position in which the surface of the one or more upper contact cleaning roller is withdrawn upwards, away from the inbound and outbound conveyors, and one or more lower contact cleaning rollers positioned below the conveyor surface, wherein the one or more lower contact cleaning rollers are movable between a cleaning position in which a surface of the one or more lower contact cleaning rollers is coplanar with the inbound conveyor and the outbound conveyor, and a withdrawn position in which the surface of the one or more lower contact cleaning rollers is withdrawn below a plane of the inbound and outbound conveyors; and wherein the inbound conveyor is arranged to convey the substrate towards the one or more upper contact cleaning roller and/or the one or more lower contact cleaning rollers.

Advantageously, by moving the inbound and/or outbound conveyors and moving the one or more lower contact cleaning rollers and/or upper contact cleaning rollers, the contact cleaning system can be adjusted to clean a top surface of a substrate, a lower surface of a substrate, both upper and lower surfaces of a substrate, or to allow the substrate to bypass all the contact cleaning rollers.

In certain embodiments, the inbound and outbound conveyors, the one or more lower contact cleaning rollers and the one or more upper contact cleaning rollers may be movable between a top and bottom cleaning mode, a top cleaning mode, and a bypass mode of the contact cleaning system. In the top and bottom cleaning mode, the one or more upper contact cleaning rollers are in the cleaning position, the one or more lower contact cleaning rollers are in the cleaning position and the inbound conveyor and/or the outbound conveyor is in the retracted position. In the top cleaning mode the one or more upper contact cleaning rollers are in the cleaning position, the one or more lower contact cleaning rollers are in the withdrawn position and the inbound conveyor and/or the outbound conveyor is in the extended position. In the bypass mode the one or more upper contact cleaning rollers are in the withdrawn position, the one or more lower contact cleaning rollers are in the withdrawn position and the inbound conveyor and/or the outbound conveyor is in the extended position.

In certain embodiments, the inbound conveyor and the outbound conveyor may be in the retracted position when the one or more lower contact cleaning rollers are in the retracted position. The distance between the inbound conveyor and the outbound conveyor may be sized to receive the one or more lower contact cleaning rollers therebetween.

Advantageously, the inbound conveyor conveys a substrate to the one or more lower contact cleaning rollers to allow the lower surface of the substrate to be cleaned.

In certain embodiments, the contact cleaning system may comprise the one or more upper contact cleaning rollers and the one or more lower contact cleaning rollers.

Advantageously, both the upper surface and the lower surface of a substrate can be cleaned simultaneously when the one or more lower contact cleaning rollers and the one or more upper contact cleaning rollers are both in the cleaning position. Accordingly, the contact cleaning system is in the top and bottom cleaning mode.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF SEVERAL VIEWS OF THE DRAWINGS

One or more embodiments of the disclosure will now be described by way of example only, with reference to the accompanying drawings, in which.

DETAILED DESCRIPTION

Figure 1:
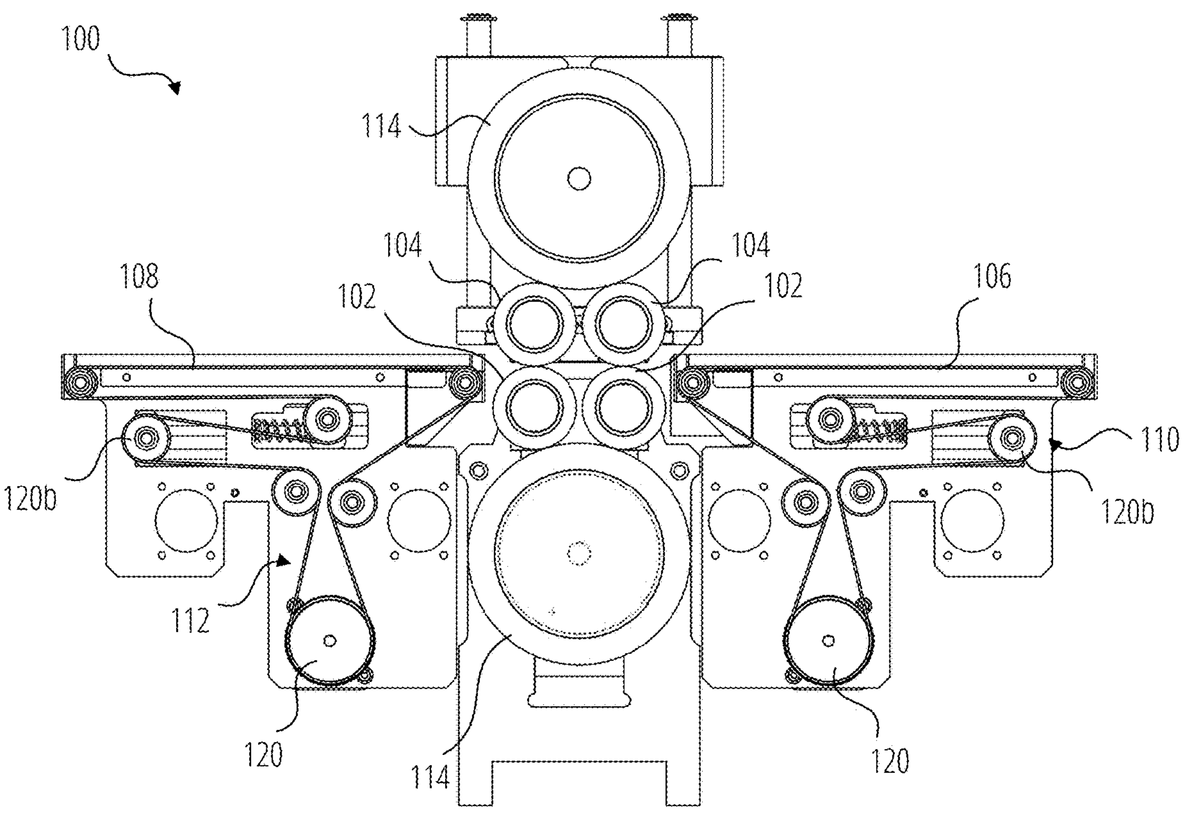
FIG. 1 shows a contact cleaning system according to the present disclosure in a top and bottom cleaning mode.
Figure 2:
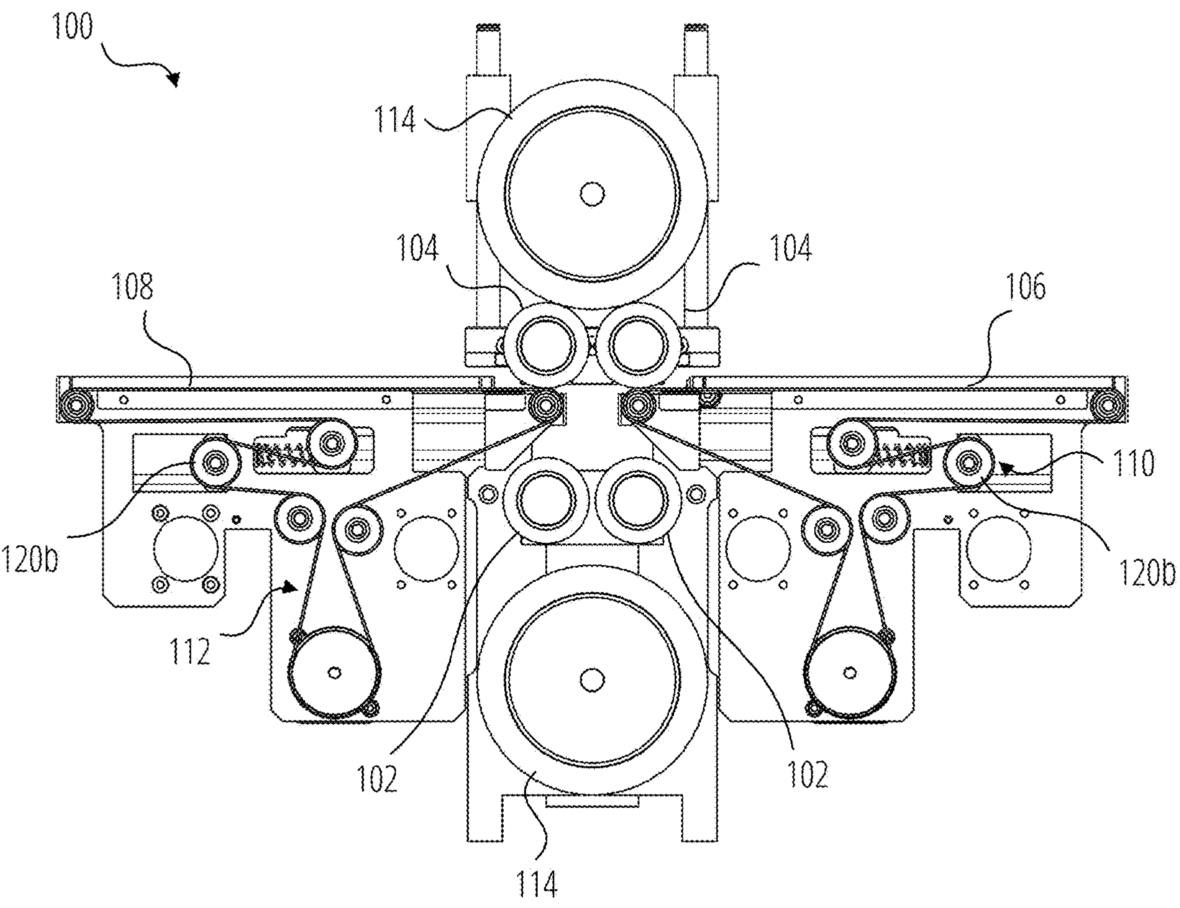
FIG. 2 shows the contact cleaning system of FIG. 1 in an top cleaning mode.
Figure 3:
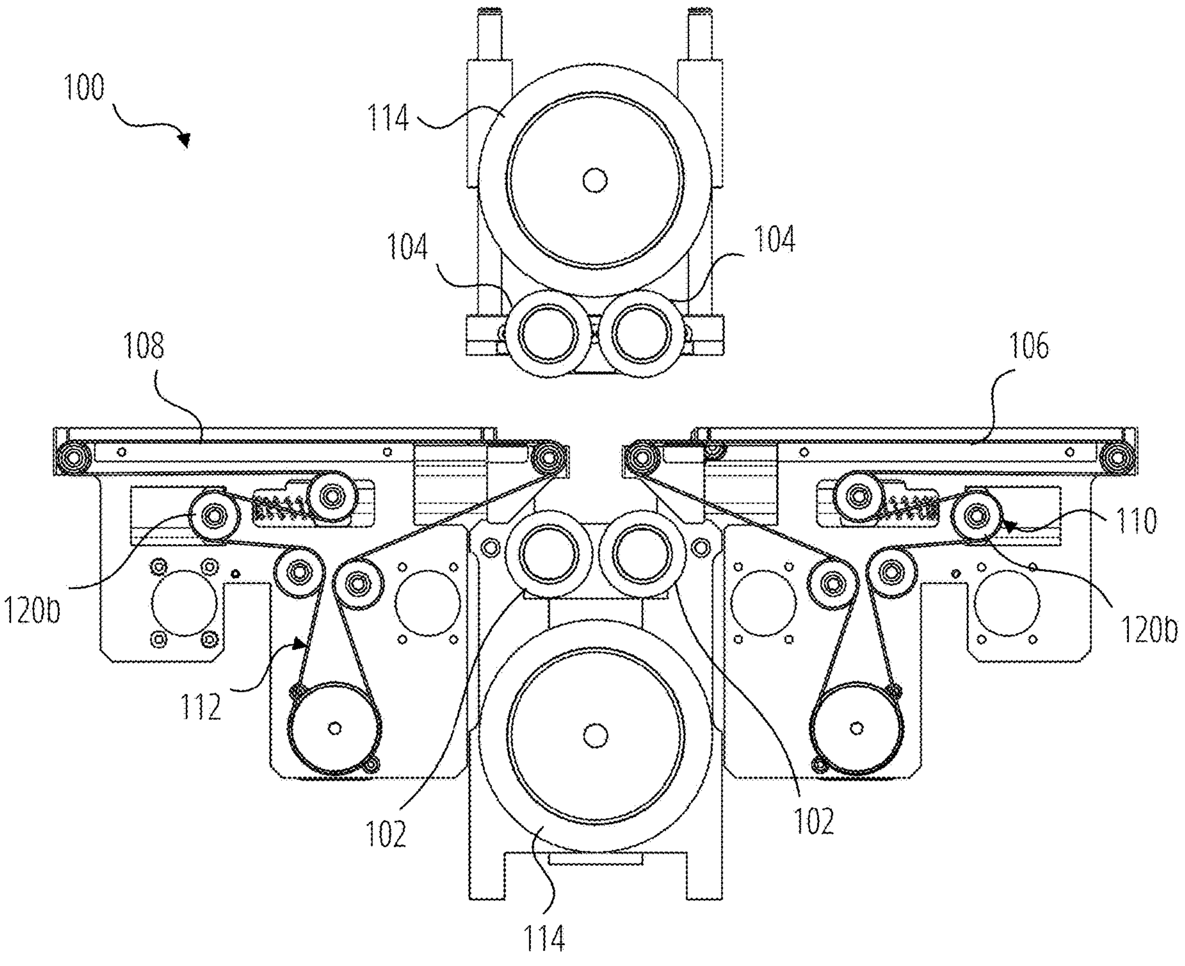
FIG. 3 shows the contact cleaning system of FIG. 1 in a bypass mode.

FIGS. 1 to 3, show a contact cleaning system 100 according to the present disclosure. The contact cleaning system 100 includes two lower contact cleaning rollers 102 and two upper contact cleaning rollers 104. The contact cleaning system 100 also includes an inbound conveyor 106 arranged to convey a substrate towards the lower and upper contact cleaning rollers 102, 104, and an outbound conveyor 108 arranged to convey the substrate away from the lower and upper contact cleaning rollers 102, 104.

The inbound conveyor 106 and the outbound conveyor 108 are arranged in a single plane. In other words, an upper surface of the inbound conveyor 106 is level with an upper surface of the outbound conveyor 108. Both the inbound conveyor 106 and the outbound conveyor 108 are movable relative to one another between a retracted position, as shown in FIG. 1, and an extended position, as shown in FIGS. 2 and 3, as will be discussed in further detail below. According to alternative embodiments, only the inbound conveyor 106 or the outbound conveyor 108 is movable between the retracted position and the extended position.

The inbound conveyor 106 has an inbound conveyor tensioning mechanism 110 which maintains the inbound conveyor 106 in a taut configuration in both the retracted position and the extended position. The outbound conveyor 108 has an outbound conveyor tensioning mechanism 112 which maintains the outbound conveyor 108 in a taut configuration in both the retracted position and the extended position. Details of the inbound and outbound conveyor tensioning mechanisms 110, 112 are discussed in further detail below.

The two lower contact cleaning roller 102 are positioned below the plane of the inbound and outbound conveyors 106, 108. The two lower contact cleaning rollers 102 are movable between a cleaning position in which a surface of each of the lower contact cleaning rollers 102 is co-planar with the inbound conveyor 106 and the outbound conveyor 108, as shown in FIG. 1, and a withdrawn position in which the surface of each of the lower contact cleaning rollers 102 is withdrawn or retracted below the plane of the inbound and outbound conveyors 106, 108, as shown in FIGS. 2 and 3. In other words, when the lower contact cleaning rollers 102 are in the cleaning position, the surface of each of the lower contact cleaning rollers 102 is level with the upper surface of the inbound conveyor 106 and the upper surface of the outbound conveyor 108. When the lower contact cleaning rollers 102 are in the withdrawn position, the surface of each of the lower contact cleaning rollers 102 is below the upper surface of the inbound conveyor 106 and the upper surface of the outbound conveyor 108. In the cleaning position, the lower contact cleaning rollers 102 can clean a lower surface of the substrate as it is conveyed from the inbound conveyor 106 to the outbound conveyor 108. A surface of the lower contact cleaning rollers 102 is in the plane of inbound and outbound conveyors 106, 108 such that the substrate remains level as it is conveyed from the inbound conveyor 106 to the outbound conveyor 108. In the withdrawn position, the lower contact cleaning rollers 102 will not contact the substrate as it is conveyed from the inbound conveyor 106 to the outbound conveyor 108.

The two upper contact cleaning rollers 104 are positioned above the surface of the inbound and outbound conveyors 106, 108. The upper contact cleaning rollers 104 are also movable between a cleaning position in which a surface of each of the upper contact cleaning rollers 104 is arranged to contact an upper surface of a substrate conveyed from the inbound conveyor to the outbound conveyor, as shown in FIGS. 1 and 2, and a withdrawn position in which the surface of each of the upper contact cleaning rollers 104 is withdrawn or retracted upwards, away from the inbound and outbound conveyors 106, 108, as shown in FIG. 3. In the cleaning position, the upper contact cleaning rollers 104 can clean an upper surface of the substrate as it is conveyed from the inbound conveyor 106 to the outbound conveyor 108. In the withdrawn position, the upper contact cleaning rollers 104 will not contact the substrate as it is conveyed from the inbound conveyor 106 to the outbound conveyor 108.

The lower and upper contact cleaning rollers 102, 104, have an elastomeric outer layer. The elastomeric outer layer collects debris from a surface of the substrate as the substrate comes into contact with the elastomeric outer layer.

Each of the upper contact cleaning rollers 104 and the lower contact cleaning rollers 102 are movable along a substantially vertical axis, towards and away from the from the plane of the inbound and outbound conveyors 106, 108.

The contact cleaning system 100 also includes two adhesive rolls 114. A first adhesive roll 114 is positioned in contact with the two lower contact cleaning rollers 102. A second adhesive roll 114 is positioned in contact with the two upper contact cleaning rollers 104. A surface of each of the adhesive rolls 114 comprises an adhesive which collects and removes debris from the elastomeric outer layer of the respective lower or upper contact cleaning rollers 102, 104.

FIG. 1 shows the contact cleaning system 100 in a top and bottom cleaning mode. In the top and bottom cleaning mode, both the top and bottom surfaces of a substrate conveyed through the ocontact contact cleaning system 100 are cleaned.

The inbound conveyor 106 and the outbound conveyor 108 are in a retracted position. The distance (A) between the inbound conveyor 106 and the outbound conveyor 108 is a first distance ($A_{cleaning}$). As shown in FIG. 1, the inbound and outbound conveyors 106, 108 are fully retracted from one another such that the first distance ($A_{cleaning}$) is a maximum distance ($A_{max}$). However, the first distance ($A_{cleaning}$) may be less than the maximum distance ($A_{max}$). For example, the first distance ($A_{cleaning}$) may be any suitable distance which allows for the two lower contact cleaning rollers 102 to be received between the inbound conveyor 106 and the outbound conveyor 108.

As shown in FIG. 1, each of the lower contact cleaning rollers 102 and the upper contact cleaning rollers 104 are in the cleaning position in the top and bottom cleaning mode. The lower contact cleaning rollers 102 are co-planar with the inbound conveyor 106 and the outbound conveyor 108 such that a substrate will be conveyed from the inbound conveyor 106, over the lower contact cleaning roller 102 and to the outbound conveyor 108. The upper contact cleaning rollers 104 are positioned opposite the lower contact cleaning rollers 102, and the substrate will be received between the lower contact cleaning rollers 102 and the upper contact cleaning rollers 104. The upper contact cleaning rollers 104 are positioned such that they will contact an upper surface of the substrate while the lower contact cleaning rollers 102 simultaneously contact the lower surface of the substrate. Accordingly, both the upper and lower surfaces of the substrate will be cleaned as the substrate is conveyed from the inbound conveyor 106 to the outbound conveyor 108 via the lower and upper contact cleaning rollers 102, 104.

FIG. 2 shows the contact cleaning system 100 in a top cleaning mode. In the top cleaning mode, only the top surface of a substrate conveyed through the contact contact cleaning system 100 are cleaned.

The inbound conveyor 106 and the outbound conveyor 108 are in an extended position. The distance (A) between the inbound conveyor 106 and the outbound conveyor 108 is less than the first distance ($A_{cleaning}$). As shown in FIG. 2, the inbound and outbound conveyors 106, 108 are fully extended towards one another such that the distance (A) is a minimum distance ($A_{min}$). However, the distance between the inbound conveyor 106 and the outbound conveyor 108 may be any distance that is less than first distance ($A_{cleaning}$). For example, the distance (A) may be any suitable distance which allows for a substrate to be conveyed over the gap between the inbound conveyor 106 and the outbound conveyor 108. In other words, the distance (A) in the extended position is less than the length of the substrate, such that the substrate will be supported by both the inbound conveyor 106 and the outbound conveyor 108 as it is conveyed between them.

As shown in FIG. 2, the lower contact cleaning rollers 102 are in the withdrawn position and the upper contact cleaning rollers 104 are in the cleaning position in the top cleaning mode. The lower contact cleaning rollers 102 are withdrawn from the plane of the inbound conveyor 106 and the outbound conveyor 108 such that a substrate will be conveyed from the inbound conveyor 106 to the outbound conveyor 108, bypassing the lower contact cleaning roller 102. The upper contact cleaning rollers 104 are positioned above the inbound conveyor 106 and the outbound conveyor 108. The upper contact cleaning rollers 104 are positioned such that they will contact an upper surface of the substrate as it is conveyed from the inbound conveyor 106 to the outbound conveyor 108. Accordingly, the upper surface of the substrate will be cleaned as the substrate is conveyed from the inbound conveyor 106 to the outbound conveyor 108.

Alternatively, both the lower and upper contact cleaning rollers 102, 104 may be moved to the withdrawn position. In this configuration, the substrate is conveyed from the inbound conveyor 106 to the outbound conveyor 108 bypassing all the contact cleaning rollers 102, 104, in a bypass mode, as will be described with reference to FIG. 3.

FIG. 3 shows the contact cleaning system 100 in a bypass mode. In the bypass mode, the substrate bypasses the upper contact cleaning rollers 104 and the lower contact cleaning rollers 102 of the contact contact cleaning system 100 and is conveyed through the contact cleaning system 100 on the inbound conveyor 106 and the outbound conveyor 108.

The inbound conveyor 106 and the outbound conveyor 108 are in an extended position. The distance (A) between the inbound conveyor 106 and the outbound conveyor 108 is less than the first distance ($A_{cleaning}$). As shown in FIG. 3, the inbound and outbound conveyors 106, 108 are fully extended towards one another such that the distance (A) is a minimum distance ($A_{min}$). However, the distance between the inbound conveyor 106 and the outbound conveyor 108 may be any distance that is less than first distance ($A_{cleaning}$). For example, the distance (A) may be any suitable distance which allows for a substrate to be conveyed over the gap between the inbound conveyor 106 and the outbound conveyor 108. In other words, the distance (A) in the extended position is less than the length of the substrate, such that the substrate will be supported by both the inbound conveyor 106 and the outbound conveyor 108 as it is conveyed between them.

As shown in FIG. 3, the lower contact cleaning rollers 102 are in the withdrawn position and the upper contact cleaning rollers 104 are in the withdrawn position. The lower contact cleaning rollers 102 are withdrawn from the plane of the inbound conveyor 106 and the outbound conveyor 108 such that a substrate will be conveyed from the inbound conveyor 106 to the outbound conveyor 108, bypassing the lower contact cleaning roller 102. The upper contact cleaning rollers 104 are positioned above the inbound conveyor 106 and the outbound conveyor 108. The upper contact cleaning rollers 104 are withdrawn such that they will not contact an upper surface of the substrate as it is conveyed from the inbound conveyor 106 to the outbound conveyor 108. Accordingly, the neither the upper surface of the substrate nor the lower surface of the substrate will be cleaned as the substrate is conveyed from the inbound conveyor 106 to the outbound conveyor 108.

In other words, in this configuration, the substrate is conveyed from the inbound conveyor 106 to the outbound conveyor 108 bypassing all the contact cleaning rollers 102, 104. Accordingly, the substrate will not be cleaned.

Figure 4:
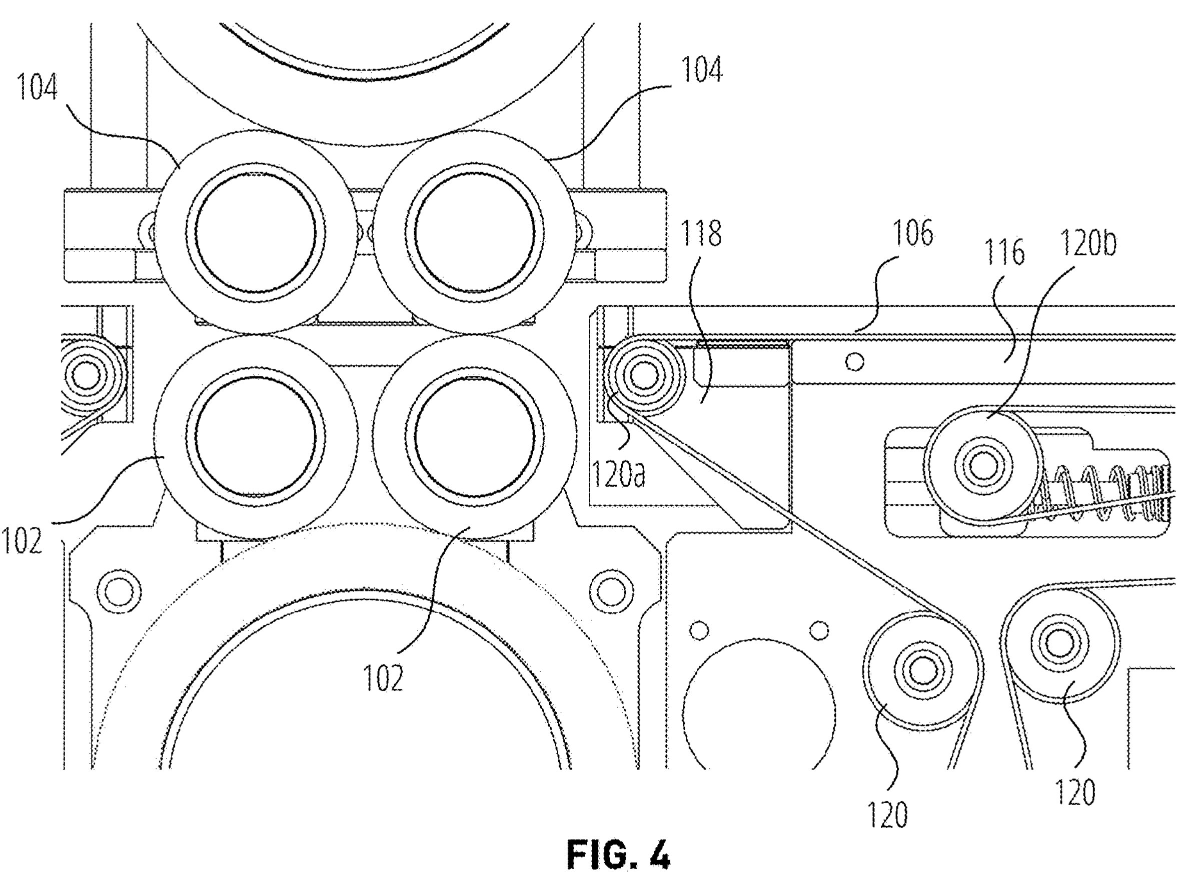
FIG. 4 shows an enlarged view of the contact cleaning system of FIG. 1 in the top and bottom cleaning mode.
Figure 5:
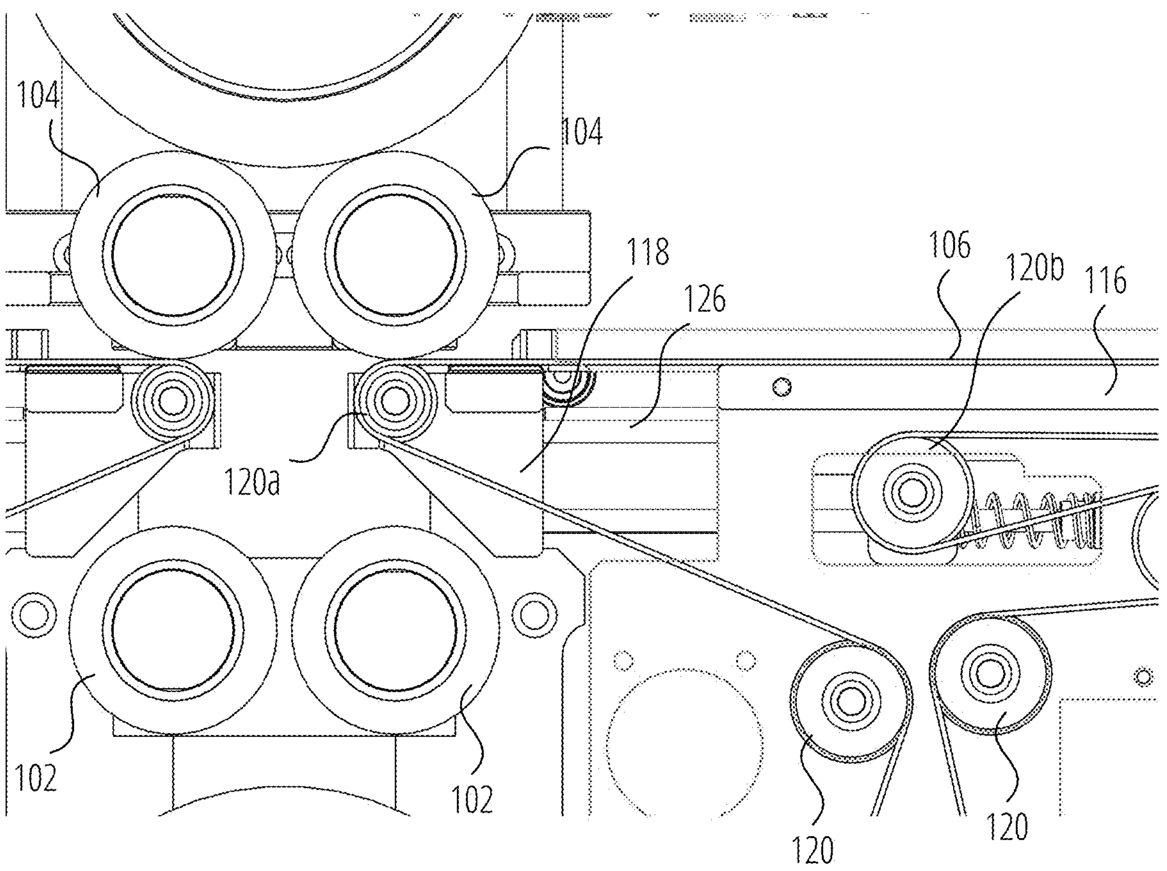
FIG. 5 shows an enlarged view of the contact cleaning system of FIG. 1 in the top cleaning mode.

FIGS. 4 and 5 show an enlarged view of the inbound conveyor 106. FIG. 4 shows the inbound conveyor 106 in the retracted position and FIG. 5 shows the inbound conveyor 106 in the extended position.

The inbound conveyor 106 has a static frame portion 116 and a movable frame portion 118. The movable frame portion 118 can move between a retracted position proximate to the static frame portion 116, as shown in FIG. 4, and an extended position away from static frame portion 116, as shown in FIG. 5. The movable frame portion 118 is extendable horizontally away from the static frame portion 116 and towards the outbound conveyor 108, along the plane of the inbound conveyor 106. The movable frame portion 118 is slidably mounted to the static frame portion 116 by longitudinally extending rods.

The movable frame portion 118 can be actuated to move by an adjustment means. In some examples, the adjustment means may be an automated adjustment means. In one example, the adjustment means is a pneumatic adjustment means. In another example, the adjustment means is a mechanical adjustment means. In a further example, the adjustment means is a an electromechanical adjustment means. The adjustment means may coupled to the inbound conveyor 106, the outbound conveyor 108 or both the inbound and outbound conveyors 106, 108.

The inbound conveyor 106 is mounted to the static frame portion 116 and the movable frame portion 118 by a series of pulleys 120. The series of pulleys 120 are part of an inbound conveyor tensioning mechanism 110 which maintains the inbound conveyor 106 in a taut configuration in both the retracted position and the extended position. The pulleys 120 rotate to move the inbound conveyor 106 such that the inbound conveyor 106 conveys a substrate thereon towards the lower contact cleaning rollers 102 and/or the upper contact cleaning rollers 104. One of the pulleys **120*a* is mounted on the movable frame portion 118 such that the inbound conveyor 106 is moved from the retracted position to the extended position when the movable frame portion 118 is moved from the retracted position to the extended position. As shown in FIGS. 1 and 2, another one of the pulleys 120*b* is slidably mounted to the static frame portion 116. The pulley 120*b* slides relative to the static frame portion 116 to compensate for the movement of the pulley 120*a* mounted to the movable frame portion 118, so as to maintain the same tension on the inbound conveyor 106 when the inbound conveyor 106** is in the retracted position and in the extended position.

The outbound conveyor 108 (as shown in FIGS. 1 and 2) also has a static frame portion 116 and a movable frame portion 118 which operates in the same way as described above. The outbound conveyor 108 is mounted to the static frame portion 116 and the movable frame portion 118 by a series of pulleys 120 in the same manner as discussed above.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A contact cleaning system, comprising:

a conveyor, the conveyor comprising:

an inbound conveyor; and an outbound conveyor spaced apart from the inbound conveyor by a distance;

wherein the inbound conveyor and/or the outbound conveyor is movable relative to the other of the inbound conveyor or the outbound conveyor between a retracted position in which the distance is a first distance and an extended position in which the distance is less than the first distance; and, wherein the conveyor is configured to support a substrate on a conveyor surface; and at least one of:

one or more upper contact cleaning roller positioned above the conveyor surface, wherein the one or more upper contact cleaning roller are movable between a cleaning position in which a surface of the one or more upper contact cleaning roller are arranged to contact an upper surface of a substrate conveyed from the inbound conveyor to the outbound conveyor, and a withdrawn position in which the surface of the one or more upper contact cleaning roller is withdrawn upwards, away from the inbound and outbound conveyors, or one or more lower contact cleaning rollers positioned below the conveyor surface, wherein the one or more lower contact cleaning rollers are movable between a cleaning position in which a surface of the one or more lower contact cleaning rollers is coplanar with the inbound conveyor and the outbound conveyor, and a withdrawn position in which the surface of the one or more lower contact cleaning rollers is withdrawn below a plane of the inbound and outbound conveyors; and wherein the inbound conveyor is arranged to convey the substrate towards the one or more upper contact cleaning roller and/or the one or more lower contact cleaning rollers.

2. The contact cleaning system according to claim 1, wherein the inbound conveyor and the outbound conveyor are configured to receive the one or more lower contact cleaning rollers therebetween when the inbound and outbound conveyors are in the retracted position.

3. The contact cleaning system according to claim 2, wherein the inbound conveyor, outbound conveyor and the surface of the one or more lower contact cleaning rollers are co-planar in the retracted position such that a substrate conveyed from the inbound conveyor to the outbound conveyor via the at least one contact cleaning roller remains level.

4. The contact cleaning system according to claim 1, wherein the distance is adjustable to be less than a length of a substrate to be supported on the conveyor when the inbound and outbound conveyors are in the extended position.

5. The contact cleaning system according to claim 1, wherein the distance is a minimum distance in the extended position.

6. The contact cleaning system according to claim 1, wherein the distance is a maximum distance in the retracted position.

7. The contact cleaning system according to claim 1, wherein the inbound conveyor comprises an inbound conveyor tensioning mechanism configured to maintain the inbound conveyor in a taut configuration in each of the retracted position and the extended position.

8. The contact cleaning system according to claim 1, wherein the outbound conveyor comprises an outbound conveyor tensioning mechanism configured to maintain the outbound conveyor in a taut configuration in each of the retracted position and the extended position.

9. The contact cleaning system according to claim 1, wherein the conveyor further comprises at least one of a: mechanical adjustment means, pneumatic adjustment means, or electromechanical adjustment means, configured to move the inbound conveyor and/or the outbound conveyor between the retracted position and the extended position.

10. The contact cleaning system according to claim 1, wherein the inbound conveyor and the outbound conveyor are in the retracted position when the one or more lower contact cleaning rollers are in the cleaning position, and the distance between the inbound conveyor and the outbound conveyor is sized to receive the one or more lower contact cleaning rollers therebetween.

11. The contact cleaning system according to claim 1, comprising the one or more upper contact cleaning rollers and the one or more lower contact cleaning rollers.

* * * * *